(12) United States Patent
Ohtani

(10) Patent No.: US 10,253,172 B2
(45) Date of Patent: Apr. 9, 2019

(54) AIR BAG COVER AND THERMOPLASTIC ELASTOMER COMPOSITION THEREFOR

(75) Inventor: Kousuke Ohtani, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 424 days.

(21) Appl. No.: 13/437,887

(22) Filed: Apr. 2, 2012

(65) Prior Publication Data

US 2012/0259057 A1    Oct. 11, 2012

(30) Foreign Application Priority Data

Apr. 5, 2011    (JP) ................. 2011-083346

(51) Int. Cl.
| | |
|---|---|
| C08L 47/00 | (2006.01) |
| C08L 23/16 | (2006.01) |
| C08L 23/10 | (2006.01) |
| B60R 21/207 | (2006.01) |
| B60R 21/2165 | (2011.01) |

(52) U.S. Cl.
CPC ............ C08L 23/16 (2013.01); C08L 23/10 (2013.01); *B60R 21/207* (2013.01); *B60R 21/2165* (2013.01)

(58) Field of Classification Search
CPC ......... B60R 21/20; B29C 65/08; C08L 23/04; C08L 23/10; C08L 23/16; C08L 47/00
USPC .................. 280/728.3; 524/525, 192; 428/53
See application file for complete search history.

(56) References Cited

U.S. PATENT DOCUMENTS

| | | | | |
|---|---|---|---|---|
| 6,176,510 | B1 * | 1/2001 | Masubuchi ............ | C08L 23/10 280/728.1 |
| 2006/0199909 | A1 * | 9/2006 | Toyoda et al. ................. | 525/192 |
| 2007/0225446 | A1 | 9/2007 | Nakano et al. | |
| 2008/0200615 | A1 | 8/2008 | Niemark et al. | |
| 2010/0207365 | A1 * | 8/2010 | Ohtani ................ | B29C 45/0001 280/728.3 |
| 2011/0065865 | A1 * | 3/2011 | Bokhari et al. ................. | 525/99 |

FOREIGN PATENT DOCUMENTS

| | | |
|---|---|---|
| CN | 1831040 A | 9/2006 |
| CN | 1916055 A | 2/2007 |
| CN | 101041733 A | 9/2007 |
| CN | 101754996 A | 6/2010 |
| CN | 101845194 | 9/2010 |
| EP | 0733676 A1 | 9/1996 |
| JP | 8-27331 | 1/1996 |
| JP | 2003183459 A | 7/2003 |
| JP | 2006282992 A | 10/2006 |
| JP | 2008-45037 | 2/2008 |
| JP | 2008045038 A | 2/2008 |
| WO | WO2009011448 * | 1/2009 |

OTHER PUBLICATIONS

First Office Action dated Apr. 30, 2015 issued in connection with Chinese Application No. 20121020227.1.
State Intellectual Property Office, P.R. China. Second Chinese Office Action and Search Report dated Dec. 23, 2015 issued in Chinese Patent Application No. 201210202217.1 with English Language Translation. 31 pages.
State Intellectual Property Office, P.R. China. Third Chinese Office Action dated May 25, 2016 in Chinese Patent Application No. 201210202217.1 with English Language Translation. 22 pages.
State Intellectual Property Office, P.R. China. Chinese Decision on Rejection dated Nov. 30, 2016 issued in Chinese Patent Application No. 201210202217.1 with English Language Translation. 23 pages.
Japan Patent Office. Japan Notification of Reasons for Refusal dated Oct. 2, 2015 issued in Japanese Patent Application No. 2012-035876 with JPO Machine English Language Translation. 7 pages.
Korean Intellectual Property Office. KIPO Notification of Reason for Refusal issued Sep. 14, 2017, issued in Korean Patent Application No. 10-2012-0034282 with English Language Translation. 19 pages.
Intellectual Property India Patent Office. INDIA Examination Report dated Sept. 27, 2018, issued in Indian Patent Application No. 1351/CHE/2012. 5 pages.

* cited by examiner

*Primary Examiner* — Deve E Valdez
(74) *Attorney, Agent, or Firm* — Foley & Lardner LLP

(57) ABSTRACT

There is provided a thermoplastic elastomer composition for an air bag cover obtained by dynamically heat-treating, in the presence of a cross-linking agent, and the following components (A1), (B) and (C), wherein component (A1): a propylene-based resin, component (B): an ethylene-α-olefin-nonconjugated diene copolymer rubber, and component (C): a mineral oil-based softener, which is excellent in appearance and mechanical strength.

7 Claims, 1 Drawing Sheet

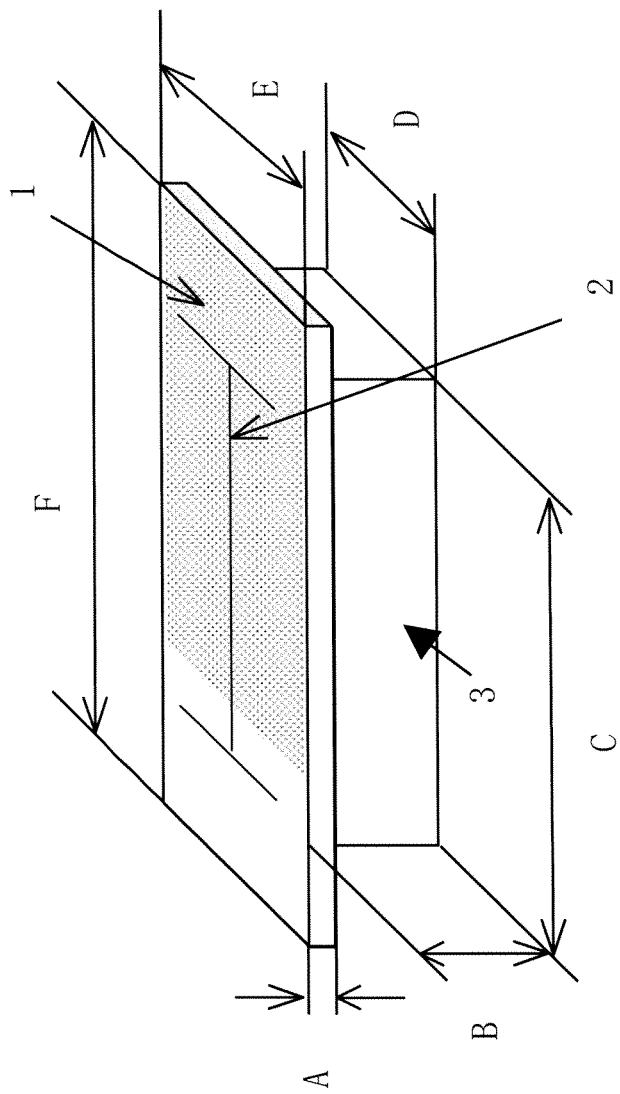

AIR BAG COVER AND THERMOPLASTIC ELASTOMER COMPOSITION THEREFOR

BACKGROUND OF THE INVENTION

The present invention relates to an air bag cover, and a thermoplastic elastomer composition therefor.

An airbag cover of an airbag system for an automobile is demanded to have stiffness suitable for uses such as an airbag cover for a driver's seat, an airbag cover for a passenger's seat and the like, have high tensile elongation at break to avoid burst of the air bag cover at a portion other than a tear line portion, which is thin-walled portion of an air bag cover provided for bursting an air bag cover at the time of developing an air bag, have high low temperature impact strength to withstand use in cold climates, and have a suitable appearance to interior parts of an automobile.

There are proposed many injection molded air bag covers produced from a polyolefin-based thermoplastic elastomer composition composed of a propylene-based resin and an ethylene-propylene-nonconjugated diene copolymer rubber. For example, in JP-A-8-27331, an injection molded article comprising a thermoplastic elastomer composition composed of a propylene-ethylene random copolymer, an ethylene-propylene-nonconjugated diene copolymer rubber and low-density polyethylene is proposed. Also, in JPA-2000-72937, an injection molded article, which comprises a thermoplastic elastomer composition composed of a propylene-ethylene copolymer, a propylene-1-butene random copolymer and two types of ethylene-propylene-5-ethylidene-2-norbornene copolymer rubbers, is proposed. Moreover, in JP-A-2008-45037, an injection molded article, which comprises a thermoplastic elastomer composition composed of a propylene-based resin produced by multi-stage polymerization and an ethylene-propylene-5-ethylidene-2-norbornene copolymer rubber, is proposed.

SUMMARY OF THE INVENTION

However, the above-mentioned injection molded articles comprising a polyolefin-based thermoplastic elastomer composition were not always satisfactory in appearance since their molded articles might have high gloss.

In such a situation, it is an object of the present invention to provide a polyolefin-based thermoplastic elastomer composition which is excellent in the flowability required of a thermoplastic elastomer composition for an air bag cover and is suitable for an air bag cover having excellent appearance and mechanical strength.

The present invention pertains to a thermoplastic elastomer composition for an air bag cover obtained by dynamically heat-treating, in the presence of a cross-linking agent, the following components (A1), (B) and (C):

the component (A1): a propylene-based resin containing the following components (a) and (b):

the component (a): a propylene-based polymer component in which the content of a monomer unit derived from propylene is 90 to 100 wt % of the component (a); and the component (b): an ethylene-α-olefin copolymer component in which the content of a monomer unit derived from ethylene is 20 to 80 wt % and the content of a monomer unit derived from α-olefin is 80 to 20 wt % of the component (b), wherein the content of the component (a) is 70 to 90 wt % and the content of the component (b) is 30 to 10 wt %, and the total amount of components (a) and (b) is 100 wt % of the component (A1), and wherein the component (A1) has a melting temperature, measured by a differential scanning calorimeter, of 155° C. or more;

the component (B): an ethylene-α-olefin-nonconjugated diene copolymer rubber in which the content of a monomer unit derived from ethylene is 35 to 75 wt % and the content of a monomer unit derived from α-olefin is 65 to 25 wt %, wherein the total amount of the monomer unit derived from ethylene and the monomer unit derived from α-olefin is 100 wt % of component (B), and wherein the ethylene-α-olefin-nonconjugated diene copolymer rubber has an iodine value of 0.1 to 7 and a Mooney viscosity ($ML_{1+4}$, 125° C.) of 20 to 100; and the component (C): a mineral oil-based softener, wherein the content of the component (B) is 60 to 150 parts by weight and the content of the component (C) is 0 to 40 parts by weight per 100 parts by weight of the component (A1), and wherein an amount of a cross-linking agent is 0.01 to 0.3 part by weight per 100 parts by weight of the total amount of the components (A1), (B) and (C).

Also, the present invention pertains to a thermoplastic elastomer composition for an air bag cover obtained by dynamically heat-treating, in the presence of a cross-linking agent, components (A1), (A2), (B) and (C):

the component (A1): a propylene-based resin containing the following components (a) and (b):

the component (a): a propylene-based polymer component in which the content of a monomer unit derived from propylene is 90 to 100 wt % of the component (a); and the component (b): an ethylene-α-olefin copolymer component in which the content of a monomer unit derived from ethylene is 20 to 80 wt % and the content of a monomer unit derived from α-olefin is 80 to 20 wt % of the component (b), wherein the content of the component (a) is 70 to 90 wt % and the content of the component (b) is 30 to 10 wt %, and the total amount of the components (a) and (b) is 100 wt % of the component (A1), and wherein the component (A1) has a melting temperature, measured by a differential scanning calorimeter, of 155° C. or more;

the component (A2): a propylene-based resin in which the content of a monomer unit derived from propylene is 90 to 98 wt % of the component (A2);

the component (B): an ethylene-α-olefin-nonconjugated diene copolymer rubber in which the content of a monomer unit derived from ethylene is 35 to 75 wt % and the content of a monomer unit derived from α-olefin is 65 to 25 wt %, wherein the total amount of the monomer unit derived from ethylene and the monomer unit derived from α-olefin is 100 wt % of the component (B), and wherein the ethylene-α-olefin-nonconjugated diene copolymer rubber has an iodine value of 0.1 to 7 and a Mooney viscosity ($ML_{1+4}$, 125° C.) of 20 to 100; and the component (C): a mineral oil-based softener, wherein the content of the component (B) is 60 to 150 parts by weight and the content of the component (C) is 0 to 40 parts by weight per 100 parts by weight of the total amount of the components (A1) and (A2), and wherein an amount of a cross-linking agent is 0.01 to 0.3 part by weight per 100 parts by weight of the total amount of the components (A1), (A2), (B) and (C).

In accordance with the present invention, it is possible to provide embodiments of the thermoplastic elastomer composition for an air bag cover which is excellent in appearance, flowability and mechanical strength.

Moreover, by using the component (A1), which is a propylene-based resin with a specific amount of the component (A2), which is propylene-based resin, embodiments of the thermoplastic elastomer composition for an air bag cover can be provided with excellent whitening resistance at the time of deforming the resulting molded article.

BRIEF DESCRIPTION OF THE DRAWING

FIG. 1 is a schematic oblique view of an example of the box-shaped injection molded article of the invention.
1 Grain
2 Tear Line
3 Gate
A Thickness of the molded article
B Height of the box frame
C Long side of the box frame
D Short side of the box frame
E Short side of the bottom plate of the box
F Long side of the bottom plate of the box

DETAILED DESCRIPTION OF PREFERRED EMBODIMENTS

The component (A1) is a propylene-based resin containing the following components (a) and (b):

the component (a): a propylene-based polymer component in which the content of a monomer unit derived from propylene is 90 to 100 wt % of the amount of the component (a); and the component (b): an ethylene-α-olefin copolymer component in which the content of a monomer unit derived from ethylene is 20 to 80 wt % of the amount of the component (b).

The propylene-based polymer component of the component (a) may have a monomer unit derived from another monomer in addition to the monomer unit derived from propylene (propylene unit). Examples of another monomer include ethylene and α-olefins having 4 to 20 carbon atoms. Examples of the α-olefins include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, 3-methyl-1-butene, 3-methyl-1-pentene, 4-methyl-1-pentene, 2-ethyl-1-hexene and 2,2,4-trimethyl-1-pentene. Among these, ethylene and α-olefins having 4 to 10 carbon atoms are preferred, and ethylene, 1-butene, 1-hexene and 1-octene are more preferred. These are used singly or in combination of two or more.

The content of a propylene unit of the component (a) is 90 to 100 wt % of the amount of the component (a), preferably 95 to 100 wt %, and more preferably 98 to 100 wt % from the viewpoint of the heat resistance and stiffness of a molded article. The content of the propylene unit can be determined by infrared spectroscopy.

Examples of the propylene-based polymer component of the component (a) include a propylene homopolymer component, a propylene-ethylene copolymer component, a propylene-1-butene copolymer component, a propylene-1-hexene copolymer component, a propylene-1-octene copolymer component, a propylene-ethylene-1-butene copolymer component, a propylene-ethylene-1-hexene copolymer component and a propylene-ethylene-1-octene copolymer component. Among these, the propylene homopolymer component and components of copolymers of propylene and at least one monomer selected from ethylene and α-olefins having 4 to 10 carbon atoms are preferred.

The ethylene-α-olefin copolymer component of the component (b) is a copolymer having a monomer unit derived from ethylene (ethylene unit) and a monomer unit derived from α-olefin (α-olefin unit). Examples of the α-olefins include propylene, 1-butene, 2-methylpropylene, 1-pentene, 3-methyl-1-butene, 1-hexene, 4-methyl-1-pentene and 1-octene. Among these, α-olefins having 3 to 10 carbon atoms are preferred, and propylene, 1-butene, 1-hexene and 1-octene are more preferred. These are used singly or in combination of two or more.

The content of an ethylene unit of the component (b) is 20 wt % or more of the amount of the component (b), preferably 22 wt % or more, and more preferably 25 wt % or more from the viewpoint of the low temperature impact strength of a molded article. Further, the content of an ethylene unit of the component (b) is 80 wt % or less of the amount of the component (b), preferably 60 wt % or less, and more preferably 50 wt % or less from the viewpoint of the low temperature impact strength of a molded article. The content of an α-olefin unit of the component (b) is preferably 80 wt % or less of the amount of the component (b), more preferably 78 wt % or less, and furthermore preferably 75 wt % or less from the viewpoint of the low temperature impact strength of a molded article. Further, the content of an α-olefin unit of the component (b) is preferably 20 wt % or more of the amount of the component (b), more preferably 40 wt % or more, and furthermore preferably 50 wt % or more from the viewpoint of the low temperature impact strength of a molded article. The contents of the ethylene unit and the α-olefin unit can be determined by infrared spectroscopy.

Examples of the ethylene-α-olefin copolymer component of the component (b) include an ethylene-propylene copolymer component, an ethylene-1-butene copolymer component, an ethylene-1-hexene copolymer component, an ethylene-1-octene copolymer component, an ethylene-propylene-1-butene copolymer component, an ethylene-propylene-1-hexene copolymer component and an ethylene-propylene-1-octene copolymer component. Among these, components of copolymers of α-olefins having 3 to 10 carbon atoms and ethylene are preferred.

The content of the component (a) in the component (A1) is 70 to 90 wt % and the content of the component (b) in the component (A1) is 30 to 10 wt %, and from the viewpoint of the appearance and low temperature impact strength of a molded article, preferably, the content of the component (a) is 72 to 88 wt % and the content of the component (b) is 28 to 12 wt %, and more preferably, the content of the component (a) is 75 to 85 wt % and the content of the component (b) is 25 to 15 wt %, provided that the amount of the component (A) is 100 wt %.

The component (A1) is preferably one in which a 20° C. xylene soluble portion has an intrinsic viscosity (135° C., tetralin) [ηcxs] of 2 to 10 and a ratio ([ηcxs]/[ηcxis]) of [ηcxs] to an intrinsic viscosity (135° C., tetralin) [ηcxis] of a 20° C. xylene insoluble portion is 2 to 10, and more preferably one in which the [ηcxs]/[ηcxis] is 4 to 8. A reduced viscosity is measured in tetralin at 135° C. using an Ubbelohde type viscometer and then the intrinsic viscosity is determined by extrapolation of the reduced viscosity using the calculation method described in "Kobunshi Yoeki, Kobunshi Jikkengaku 11" (Polymer Solution, Polymer Experiment 11) (published by Kyoritsu Shuppan Co., Ltd. in 1982), page 491. Here, the 20° C. xylene soluble portion (CXS portion) and the 20° C. xylene insoluble portion (CXIS portion) can be obtained by the following method. A solution is prepared by completely dissolving about 5 g of the component (A) in 500 ml of boiled xylene and then the solution is gradually cooled to room temperature, followed by allowing it to stand for 4 hours or more at 20° C. to separate into a precipitate and a solution by filtration. The precipitate is obtained as a CXIS portion, and a CXS portion can be obtained by removing a solvent from the solution to recover a polymer dissolved in the solution.

A melting temperature of the component (A1) is preferably 155° C. or more, and more preferably 160° C. or more from the viewpoint of the mold releasability of a molded article in injection molding. Further, the melting temperature is usually 175° C. or less. The melting temperature is a peak temperature of an endothermic peak having the highest peak temperature in the differential scanning calorie curve in a heating operation measured by a differential scanning calorimeter. The differential scanning calorie curve is measured under the following measurement conditions by the differential scanning calorimeter, and the melting temperature is determined from the differential scanning calorie curve in a heating operation.

<Measurement Conditions>

Cooling operation: The component (A1) is melted at 220° C., and then cooled at a cooling rate of 5° C./rain from 220° C. to −90° C.

Heating operation: A temperature is raised at 5° C./rain from −90° C. to 200° C. immediately after the cooling operation.

The melt flow rate (230° C., 21.18 N) of the component (A1) is preferably 10 to 300 g/10 min and more preferably 20 to 200 g/10 min from the viewpoint of the appearance and the tensile elongation at break of a resulting molded article. The melt flow rate is measured at a temperature of 230° C. under a load of 21.18 N according to JIS K 7210.

As a method for producing the propylene-based resin of the component (A1), a publicly known method of polymerization using a publicly known catalyst for olefin polymerization is used. Examples of the method of polymerization include a multi-stage polymerization method using a Ziegler-Natta catalyst. A slurry polymerization method, a solution polymerization method, a bulk polymerization method and a gas-phase polymerization method can be used for the multi-stage polymerization method, and these methods may be used in combination of two or more thereof. Further, a commercially available applicable article may be used.

The component (A1) propylene-based resin is preferably used in conjunction with the following component (A2) propylene-based resin from the viewpoint of enhancing the whitening resistance at the time of deforming a resulting molded article.

The component (A2): a propylene-based resin in which the content of a monomer unit derived from propylene is 90 to 98 wt %.

The component (A2) is a propylene-based resin in which the content of a monomer unit derived from propylene is 90 to 98 wt %, provided that the amount of the component (A2) is 100 wt %, and when the content of the monomer unit derived from propylene is too small, the whitening resistance at the time of deforming a resulting molded article is insufficient.

The propylene-based resin of the component (A2) has a monomer unit derived from another monomer in addition to the monomer unit derived from propylene. Examples of another monomer include ethylene and α-olefins having 4 to 20 carbon atoms. Examples of the α-olefins include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, 3-methyl-1-butene, 3-methyl-1-pentene, 4-methyl-1-pentene, 2-ethyl-1-hexene and 2,2,4-trimethyl-1-pentene. Among these, ethylene and α-olefins having 4 to 10 carbon atoms are preferred, and ethylene, 1-butene, 1-hexene and 1-octene are more preferred. These are used singly or in combination of two or more.

As a method for producing the propylene-based resin of the component (A2), a publicly known method of polymerization using a publicly known catalyst for olefin polymerization is used. Examples of the method of polymerization include a polymerization method using a Ziegler-Natta catalyst. A slurry polymerization method, a solution polymerization method, a bulk polymerization method and a gas-phase polymerization method can be used for the polymerization method, and these methods may be used in combination of two or more thereof. Further, a commercially available applicable article may be used.

The ethylene-α-olefin-nonconjugated diene copolymer rubber of the component (B) has a Mooney viscosity ($ML_{1+4}$, 125° C.), measured at 125° C., of 20 to 100, and preferably has a Mooney viscosity of 25 to 80. When the Mooney viscosity is too small, the mold releasability or the mechanical strength of a resulting air bag cover molded article may be low, and when the Mooney viscosity is too large, the melt flowability of the thermoplastic elastomer composition may be low. The Mooney viscosity is measured according to ASTM 0-1646.

The content of the monomer unit derived from ethylene in the ethylene-α-olefin-nonconjugated diene copolymer rubber of the component (B) is 35 wt % or more, and is preferably 45 wt % or more and more preferably 55 wt % or more from the viewpoint of the mold releasability or the mechanical strength of an air bag cover molded article, wherein the total amount of the monomer unit derived from ethylene and the monomer unit derived from α-olefin is 100 wt %. Further, the content of the monomer unit derived from ethylene is 75 wt % or less, preferably 73 wt % or less, and more preferably 70 wt % or less, from the viewpoint of low temperature impact, wherein the total amount of the monomer unit derived from ethylene and the monomer unit derived from α-olefin is 100 wt %.

The content of the monomer unit derived from α-olefin in the component (B) is 65 wt % or less, and is preferably 55 wt % or less and more preferably 45 wt % or less from the viewpoint of the mold releasability or the mechanical strength of an air bag cover molded article, wherein the total amount of the monomer unit derived from ethylene and the monomer unit derived from α-olefin is 100 wt %. Further, the content of the monomer unit derived from α-olefin is 25 wt % or more, and is preferably 27 wt % or more and more preferably 30 wt % or more from the viewpoint of the low temperature impact, wherein the total amount of the monomer unit derived from ethylene and the monomer unit derived from α-olefin is 100 wt %.

The content of the monomer unit derived from ethylene and the content of the monomer unit derived from α-olefin can be determined by infrared spectroscopy.

Examples of the α-olefin used in the component (B) include propylene, 1-butene, 1-hexene and 1-octene from the viewpoint of ease of availability.

Examples of the nonconjugated diene contained in the component (B) include chain nonconjugated dienes such as 1,4-hexadiene, 1,6-octadiene, 2-methyl-1,5-hexadiene, 6-methyl-1,5-heptadiene and 7-methyl-1,6-octadiene; cyclic nonconjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl- 2-norbornene; and trienes such as 2,3-diisopropylidene-5-norbornene, 2-ethylidene-3-isopropylidene-5-norbornene, 2-propenyl-2,2-norbornadiene, 1,3,7-octatriene and 1,4,9-decatoriene, and preferred are 5-ethylidene-2-norbornene and dicyclopentadiene.

The component (B) contains a monomer unit derived from nonconjugated diene in such a way that an iodine value of the component (B) is 0.1 to 7, preferably 0.1 to 5, and more preferably 1 to 3. When the content of the nonconjugated diene in the component (B) is too small, the gloss of an air bag cover molded article may be high, and when the content of the nonconjugated diene is too large, the low temperature impact performance of a resulting air bag cover molded article may be deteriorated.

One or more types of the ethylene-α-olefin-nonconjugated diene copolymer rubber of the component (B) can be used for the thermoplastic elastomer composition of the present invention. An iodine value of such mixture of two or more ethylene-α-olefin-nonconjugated diene copolymer rubbers is calculated by taking account of the weight ratios of each of ethylene-α-olefin-nonconjugated diene copolymer rubbers to compounded amount of the component (B) in the thermoplastic elastomer composition, which is assumed to be 100. For example, when 50 parts by weight of a component having an iodine value of 0 and 50 parts by weight of a component having an iodine value of 10 are compounded in the thermoplastic elastomer composition, the iodine value of the component (B) used in the thermoplastic elastomer composition is considered as 5.

As a method for producing the ethylene-α-olefin-nonconjugated diene copolymer rubber of the component (B), a publicly known method of polymerization using a publicly known catalyst for olefin polymerization is used. Examples of the polymerization method include a slurry polymerization method, a solution polymerization method, a bulk polymerization method and a gas-phase polymerization method, in which a Ziegler-Natta catalyst or a catalyst of complex such as a metallocene-based complex or a nonmetallocene-based complex. Further, a commercially available applicable article may be used.

The component (C) used in the present invention is a mineral oil-based softener. Examples of the mineral oil-based softener include aromatic mineral oils, naphthenic mineral oils and paraffinic mineral oils, and the paraffinic mineral oils are preferred.

In the thermoplastic elastomer composition of the present invention, the content of the component (B) is 60 to 150 parts by weight per 100 parts by weight of the total amount of the components (A1) and (A2). When the compounded amount of the compound (B) is too small, the low temperature impact performance of an air bag cover molded article is insufficient, and when the compounded amount is too large, the melt flowability of the thermoplastic elastomer composition is insufficient and the stiffness of an air bag cover molded article is insufficient.

In the thermoplastic elastomer composition of the present invention, the content of the component (C) is 0 to 40 parts by weight and preferably 5 to 30 parts by weight per 100 parts by weight of the total amount of the components (A1) and (A2). When the compounded amount of the compound (C) is too small, the melt flowability of the thermoplastic elastomer composition may be insufficient, and when the compounded amount is too large, the low temperature impact performance and the stiffness of an air bag cover molded article are insufficient.

When the component (A2) is used, the content of the component (A2) is 70 to 30 parts by weight, wherein the total amount of the component (A1) and the component (A2) is 100 parts by weight, from the viewpoint of enhancing the whitening resistance at the time of deforming a resulting molded article and from the viewpoint of enhancing the appearance of a resulting molded article. When the content of the component (A2) is too small, the whitening resistance at the time of deforming a resulting molded article is insufficient, and when the content of the component (A2) is too large, the appearance of a resulting molded article is deteriorated.

As the cross-linking agent used in the present invention, an organic peroxide is suitable. Examples of the organic peroxides include ketone peroxides, diacyl peroxides, hydroperoxides, dialkyl peroxides, peroxy ketals, alkyl peresters, percarbonates, peroxy carbonates and peroxy esters. Specific examples of the organic peroxides include dicumylperoxide, 2,5-dimethyl-2,5-di(tert-butyl peroxy)hexane, 2,5-dimethyl-2,5-di(tert-butyl peroxy)hexyne, 1,3-bis(tert-butylperoxyisopropyl)benzene, tert-butyl cumyl peroxide, di-tert-butyl peroxide, 2,2,4-trimethylpentyl-2-hydroperoxide, diisopropylbenzohydroperoxide, cumene-peroxide, tert-butylperoxide, 1,1-di(tert-butylperoxy)-3,3,5-trimethylcyclohexane, 1,1-di-tert-butylperoxycyclohexane, isobutylyl peroxide, 2,4-dichlorobenzoyl peroxide, o-methylbenzoyl peroxide, bis(3,5,5-trimethylhexanoyl)peroxide, lauroyl peroxide, benzoyl peroxide and p-chlorobenzoyl peroxide; and combinations of two or more thereof.

The amount of the cross-linking agent is 0.01 to 0.3 part by weight and preferably 0.05 to 0.25 part by weight provided that the total amount of the components (A1), (A2), (B) and (C) is 100 wt %. When the compounded amount of the organic peroxide is too small, the melt flowability of the composition and the appearance and mechanical properties of a resulting air bag cover molded article may be insufficient, and when the compounded amount is too large, the low temperature impact performance of a resulting air bag cover molded article may be deteriorated.

A cross-linking aid may be used together with the cross-linking agent. Examples of the cross-linking aid include peroxide cross-linking aids such as N,N'-m-phenylenebismaleimide, toluoylenebismaleimide, p-quinonedioxime, nitrosobenzene, diphenylguanidine, trimethylolpropane and the like; and polyfunctional vinyl monomers such as divinyl benzene, ethylene glycol dimethacrylate, polyethylene glycol dimethacrylate, trimethylolpropane trimethacrylate, allyl methacrylate and the like.

The thermoplastic elastomer composition of the present invention can be obtained by melt-kneading the component (A1), the component (B), the component (C), and the component (A2) as an optional component, then adding the cross-linking agent, and dynamically heat-treating. The component (A1), the component (B), the component (C), and the component (A2) as an optional component may be previously melt-kneaded, cooled and then further melt-kneaded, and the cross-linking agent may be added, or the cross-linking agent may be added during melt-kneading the component (A1), the component (B), the component (C) and the component (A2) as an optional component. For example, the component (A1), the component (B), the component (C), and the component (A2) as an optional component can be supplied at an upstream position of an extruder, and a cross-linking agent can be supplied at a downstream position to the upstream position.

The thermoplastic elastomer composition of the present invention can be obtained by melt-kneading the component (A1), the component (B), the component (C), and the component (A2) as an optional component, then adding the cross-linking agent, and dynamically heat-treating, but it is preferred to compound 20 to 80 parts by weight of the component (A1) and the component (A2) after the addition of the cross-linking agent provided that the total amount of the component (A1) and the component (A2) to be used is 100 parts by weight, from the viewpoint of enhancing the low temperature impact performance and the appearance of an air bag cover molded article. For examples, it is possible that 20 to 80 parts by weight of the component (A1) and the component (A2) of 100 parts by weight of the total amount of the component (A1) and the component (A2) to be used, and all the component (B) and the component (C) are supplied at an upstream position of an extruder, and a cross-linking agent is supplied at a downstream position to the upstream position and the remaining 80 to 20 parts by weight of the component (A1) and the component (A2) are supplied at a further downstream position of the extruder. In this case, the cross-linking aid can be supplied at any of the upstream position of the extruder or the same position as that of the cross-linking agent.

It is preferred from the viewpoint of enhancing the whitening resistance at the time of deforming a resulting molded article and from the viewpoint of enhancing the low temperature impact performance and the appearance of an air bag cover molded article to produce the thermoplastic elastomer composition of the present invention by a method in which 30 to 70 parts by weight of the component (A1) and all the component (B) and the component (C) are supplied at an upstream position of an extruder, and a cross-linking agent is supplied at a downstream position to the upstream position and the remaining 70 to 30 parts by weight of the component (A2) are supplied at a further downstream position of the extruder, wherein the total amount of the component (A1) and the component (A2) is 100 parts by weight.

For imparting the mold releasability to a thermoplastic elastomer composition to enhance the production stability in injection molding, the thermoplastic elastomer composition of the present invention preferably contains the following component (D).

Component (D): at least one compound selected from the group consisting of fatty acids having 5 or more carbon atoms, fatty acid metal salts having 5 or more carbon atoms, fatty acid amides of fatty acids having 5 or more carbon atoms and fatty acid esters of fatty acids having 5 or more carbon atoms.

Examples of the fatty acid having 5 or more carbon atoms of the component (D) include lauric acid, palmitic acid, stearic acid, behenic acid, oleic acid, erucic acid, linoleic acid and ricinoleic acid.

Examples of the fatty acid metal salt having 5 or more carbon atoms of the component (D) include salts of the above fatty acids and a metal such as Li, Na, Mg, Al, K, Ca, Zn, Ba or Pb, and specific examples thereof include lithium stearate, sodium stearate, calcium stearate and zinc stearate.

Examples of fatty acid amides of fatty acids having 5 or more carbon atoms of the component (D) include lauric acid amide, palmitic acid amide, stearic acid amide, oleic acid amide, erucic acid amide, methylene-bis-stearic acid amide, ethylene-bis-stearic acid amide, ethylene-bis-oleic acid amide and stearyl diethanolamide. Among these, erucic acid amide is preferable.

Examples of fatty acid esters of fatty acids having 5 or more carbon atoms of the component (D) include esters with alcohols such as aliphatic alcohols (myristyl alcohol, palmityl alcohol, stearyl alcohol, behenyl alcohol, 12-hydroxystearyl alcohol and the like), aromatic alcohols (benzyl alcohol, β-phenylethyl alcohol, phthalyl alcohol and the like) and polyhydric alcohols (glycerin, diglycerin, polyglycerin, sorbitan, sorbitol, propylene glycol, polypropylene glycol, polyethylene glycol, pentaerythritol, trimethylolpropane and the like); and in particular an ester of the above alcohols with the above fatty acids, and specifically include glycerin monooleate, glycerin dioleate, polyethylene glycol monostearate and citric acid distearate.

The thermoplastic elastomer composition used for the present invention may contain an inorganic filler (such as talc, calcium carbonate and fired kaolin), an organic filler (such as fabrics, wood powders, cellulose powders), a lubricant (such as silicone oil and silicone rubber), an antioxidant (such as a phenol-based antioxidant, a sulfur-based antioxidant, a phosphorus-based antioxidant, a lactone-based antioxidant and a vitamin-based antioxidant), a weathering stabilizer, an ultraviolet absorber (such as a benzotriazole-based ultraviolet absorber, a triazine-based ultraviolet absorber, an anilide-based ultraviolet absorber and a benzophenone-based ultraviolet absorber), a thermal stabilizer, a light stabilizer (such as a hindered amine-based light stabilizer and a benzoate-based light stabilizer), a pigment, a nucleating agent, an adsorbent (such as a metal oxide (such as zinc oxide and magnesium oxide), a metal chloride (such as iron chloride and calcium chloride), hydrotalcite and an aluminate), and the like, as required.

The content of the component (D) is preferably 0.01 to 1.5 parts by weight and more preferably 0.05 to 1.0 part by weight per 100 parts by weight of the total amount of the components (A1), (A2), (B) and (C) from the viewpoint of the balance between the mold releasability during injection molding and the appearance of the surface of a resulting molded article.

The thermoplastic elastomer composition of the present invention can be obtained by melt-kneading the components (A1), (A2), (B), (C) and a cross-linking agent, as well as other components as required by a publicly known method, for example, a twin-screw extruder or a Banbury mixer.

The above thermoplastic elastomer composition can be formed into an air bag cover molded article of the present invention by a publicly known molding method, preferably an injection molding method.

The air bag cover comprised of the thermoplastic elastomer composition of the present invention is used as an airbag cover for a driver's seat, an airbag cover for a passenger's seat, a side airbag cover, a knee airbag cover and a curtain airbag cover.

EXAMPLES

Hereinafter, the present invention will be described in more detail by way of examples and comparative examples.
[I] Methods for Measuring Properties
(1) Melt Flow Rate (MFR)

The melt flow rates of the component (A1) and the thermoplastic elastomer composition were measured at a temperature of 230° C. under a load of 2.16 kg according to JIS K 7210.
(2) Intrinsic Viscosity ([ηcxs], [ηcxis], Unit: dl/g)

The viscosity was measured at 135° C. in tetralin as a solvent, using an Ubbelohde type viscometer.
(3) Mooney Viscosity The Mooney viscosity was measured according to ASTM D-1646.

(4) Contents of Ethylene Unit and Propylene Unit

The contents of the ethylene unit and the propylene unit were determined by a method by an infrared absorption spectrum (Model FT-IR 5200, manufactured by JASCO Corp.).

(5) Melting Temperature (Unit: ° C.)

A differential scanning calorie curve was measured under the following measurement conditions by use of a heat flow rate differential scanning calorimeter (DSC Q100 manufactured by TA Instruments Co., Ltd), and a melting temperature was determined from the differential scanning calorie curve in a heating operation.

<Measurement Conditions>

Cooling operation: The component (A1) is melted at 220° C., and then cooled at a cooling rate of 5° C./rain from 220° C. to −90° C.

Heating operation: A temperature is raised at 5° C./rain from −90° C. to 200° C. immediately after the cooling operation.

(6) Production Method of Injection Molded Article

The thermoplastic elastomer composition was injection molded under the conditions of a cylinder temperature of 220° C. and a mold temperature of 50° C. using a side gate flat plate mold in an injection molding machine, EC160NII, manufactured by Toshiba Machine Co., Ltd., to obtain an injection molded article having a length of 90 mm, a width of 150 mm and a thickness of 2 mm.

(7) Flexural Modulus (FM)

The flexural modulus was measured under the conditions of a span length of 30 mm and a flexural rate of 1 mm/min using a specimen having a thickness of 2 mm which was injection molded under the above conditions, according to JIS K 7171.

(8) Low Temperature Impact Resistance (IZOD)

The low temperature impact resistance was measured at a predetermined temperature using a specimen which was injection molded under the above conditions, according to JIS K 6911. NB=Not Broken, B=Broken (9) Appearance (Measurement of Gloss))

Using a specimen which was injection molded under the above conditions, a gloss level was measured at an incident angle of 60 degrees and at a reflection angle of 60 degrees by a gloss meter (digital variable gloss meter UGV-50P manufactured by SUGA TEST INSTRUMENTS Co., Ltd.)

(10) Whitening Resistance

[Injection Molded Article for Evaluation of Properties]

The thermoplastic elastomer composition was injection molded into a box-shaped molded article as shown in FIG. 1 with a tear line portion having a thickness of 0.5 mm under the conditions of a cylinder temperature of 250° C. and a mold temperature of 80° C. by an injection molding machine (trade name EC160NII 100-EN, manufactured by Toshiba Machine Co., Ltd.). The produced box-shaped injection molded article as shown in FIG. 1 had the following thickness and dimensions: A=3 mm, B=43 mm, C=160 mm, D=100 mm, E=120 mm, and F=180 mm. The tear line portion of the obtained molded article was flexed and a state of whitening was visually observed and rated according to the following criteria in Examples 2, 5 and 6.

Good: Whitening is not found clearly.

Poor: Whitening is found clearly.

[II] Raw Material (1) Propylene-based Resins (A1) and (A2)

(PP-1): NOBLEN WPX5343, produced by Sumitomo Chemical Co., Ltd.

MFR=60 g/10 min; melting temperature=163.5° C.; [ηcxs] 5.3; [ηcxs]/[ηcxis]=4.5

The content of the component (a)=87 wt %; the content of the component (b)=13 wt %

The content of a propylene unit in the component (a)=100 wt %

The content of an ethylene unit in the component (b)=32 wt %

The content of a propylene unit in the component (b)=68 wt %

(PP-2): NOBLEN Z144CE4, produced by Sumitomo Chemical Co., Ltd.

MFR=27 g/10 min; melting temperature=141° C.; [ηcxs]= 0.36; [ηcxs]/[ηcxis]=0.31

The content of the component (a)=100 wt %; the content of the component (b)=0 wt %

The content of a propylene unit in the component (a)=96 wt %;

The content of an ethylene unit in the component (a)=4 wt %

(2) Ethylene-α-Olefin-Nonconjugated Diene Copolymer Rubber (B)

(EPDM-1): Esprene 512P, produced by Sumitomo Chemical Co., Ltd.

Ethylene-propylene-5-ethylidene-2-norbornene copolymer; Mooney viscosity ($ML_{1+4}$, 125° C.)=60; the content of an ethylene unit=69 wt %; the content of a propylene unit=31 wt %; iodine value=1.3

(EPDM-2): Esprene 512F, produced by Sumitomo Chemical Co., Ltd.

Ethylene-propylene-5-ethylidene-2-norbornene copolymer; Mooney viscosity ($ML_{1+4}$, 125° C.)=66; the content of an ethylene unit=70 wt %; the content of a propylene unit=30 wt %; iodine value=11

(3) Mineral Oil-based Softener (C)

(Oil) paraffinic mineral oil (trade name Diana Process Oil PW-100 manufactured by Idemitsu Kosan Co., Ltd.)

Example 1

100 parts by weight of (PP-1) as the component (A1), 100 parts by weight of (EPDM-1) as the component (B), 0.1 part by weight of erucamide (NEUTRON S produced by NIPPON FINE CHEMICAL Co., Ltd.), 0.2 part by weight of an antioxidant (Sumilizer GA-80 produced by Sumitomo Chemical Co., Ltd.) and 0.1 part by weight of an antioxidant (IRGAFOS 168 produced by Ciba Speciality K.K.), and 0.8 part by weight of a cross-linking aid (trimethylolpropane trimethacrylate, trade name Hi-Cross MS50 produced by Seiko Chemical Co., Ltd.) were compounded, and the resulting mixture was melt-kneaded at a cylinder temperature of 200° C. by a twin-screw extruder, and 2.0 parts by weight (0.2 parts by weight as an organic peroxide) of 2,5-dimethyl-2,5-di(tert-butyl peroxy)hexane (organic peroxide) diluted to a 10% concentration with a paraffin-based oil was further added during melt-kneading to obtain a thermoplastic elastomer composition. The results of measurement of properties of the obtained thermoplastic elastomer composition are shown in Table 1.

Comparative Example 1

A thermoplastic elastomer composition was prepared in the same manner as in Example 1 except that the organic peroxide was not added. The results of measurement of properties of the obtained thermoplastic elastomer composition are shown in Table 1.

Comparative Example 2

A thermoplastic elastomer composition was prepared in the same manner as in Example 1 except that the amount of (EPDM-1) as the component (B) was changed to 400 parts by weight. The results of measurement of properties of the obtained thermoplastic elastomer composition are shown in Table 1.

Example 2

100 parts by weight of (PP-1) as the component (A1), 80 parts by weight of (EPDM-1) as the component (B), 20 parts by weight of (oil) as the component (C), 0.1 part by weight of erucamide (NEUTRON S produced by NIPPON FINE CHEMICAL Co., Ltd.), 0.2 part by weight of an antioxidant (Sumilizer GA-80 produced by Sumitomo Chemical Co., Ltd.) and 0.1 part by weight of an antioxidant (IRGAFOS 168 produced by Ciba Speciality K.K.), and 0.8 part by weight of a cross-linking aid (trimethylolpropane trimethacrylate, trade name Hi-Cross MS50 produced by Seiko Chemical Co., Ltd.) were compounded, and the resulting mixture was melt-kneaded at a cylinder temperature of 200° C. by a twin-screw extruder, and 2.0 parts by weight (0.2 parts by weight as an organic peroxide) of 2,5-dimethyl-2,5-di(tert-butyl peroxy)hexane (organic peroxide) diluted to a 10% concentration with a paraffin-based oil was further added during melt-kneading to obtain a thermoplastic elastomer composition. The results of measurement of properties of the obtained thermoplastic elastomer composition are shown in Table 1.

Comparative Example 3

A thermoplastic elastomer composition was prepared in the same manner as in Example 2 except that 5.0 parts by weight (0.5 part by weight as an organic peroxide) of an organic peroxide diluted to a 10% concentration with a paraffin-based oil was further added as a cross-linking agent. The results of measurement of properties of the obtained thermoplastic elastomer composition are shown in Table 1.

Example 3

100 parts by weight of (PP-1) as the component (A1), 40 parts by weight of (EPDM-1) and 40 parts by weight of (EPDM-2) as the component (B), 20 parts by weight of (oil) as the component (C), 0.1 part by weight of erucamide (NEUTRON S produced by NIPPON FINE CHEMICAL Co., Ltd.), 0.2 part by weight of an antioxidant (Sumilizer GA-80 produced by Sumitomo Chemical Co., Ltd.) and 0.1 part by weight of an antioxidant (IRGAFOS 168 produced by Ciba Speciality K.K.), and 0.8 part by weight of a cross-linking aid (trimethylolpropane trimethacrylate, trade name Hi-Cross MS50 produced by Seiko Chemical Co., Ltd.) were compounded, and the resulting mixture was melt-kneaded at a cylinder temperature of 200° C. by a twin-screw extruder, and 2.0 parts by weight (0.2 parts by weight as an organic peroxide) of 2,5-dimethyl-2,5-di(tert-butyl peroxy)hexane (organic peroxide) diluted to a 10% concentration with a paraffin-based oil was further added during melt-kneading to obtain a thermoplastic elastomer composition. The results of measurement of properties of the obtained thermoplastic elastomer composition are shown in Table 1.

Comparative Example 4

A thermoplastic elastomer composition was prepared in the same manner as in Example 2 except for using (EPDM-2) as the component (B). The results of measurement of properties of the obtained thermoplastic elastomer composition are shown in Table 1.

Comparative Example 5

100 parts by weight of (PP-1) as the component (A1), 25 parts by weight of (EPDM-1) and 25 parts by weight of (EPDM-2) as the component (B), 50 parts by weight of (oil) as the component (C), 0.1 part by weight of erucamide (NEUTRON S produced by NIPPON FINE CHEMICAL Co., Ltd.), 0.2 part by weight of an antioxidant (Sumilizer GA-80 produced by Sumitomo Chemical Co., Ltd.) and 0.1 part by weight of an antioxidant (IRGAFOS 168 produced by Ciba Speciality K.K.), and 0.8 part by weight of a cross-linking aid (trimethylolpropane trimethacrylate, trade name Hi-Cross MS50 produced by Seiko Chemical Co., Ltd.) were compounded, and the resulting mixture was melt-kneaded at a cylinder temperature of 200° C. by a twin-screw extruder, and 2.0 parts by weight (0.2 parts by weight as an organic peroxide) of 2,5-dimethyl-2,5-di(tert-butyl peroxy)hexane (organic peroxide) diluted to a 10% concentration with a paraffin-based oil was further added during melt-kneading to obtain a thermoplastic elastomer composition. The results of measurement of properties of the obtained thermoplastic elastomer composition are shown in Table 1.

Comparative Example 6

A thermoplastic elastomer composition was prepared in the same manner as in Example 2 except for using (PP-2) as the component (A2). The results of measurement of properties of the obtained thermoplastic elastomer composition are shown in Table 1.

Example 4

60 parts by weight of (22-1) as the component (A1), 80 parts by weight of (EPDM-1) as the component (B), 20 parts by weight of (oil) as the component (C), 0.1 part by weight of erucamide (NEUTRON S produced by NIPPON FINE CHEMICAL Co., Ltd.), 0.2 part by weight of an antioxidant (Sumilizer GA-80 produced by Sumitomo Chemical Co., Ltd.) and 0.1 part by weight of an antioxidant (IRGAFOS 168 produced by Ciba Speciality K.K.), and 0.8 part by weight of a cross-linking aid (trimethylolpropane trimethacrylate, trade name Hi-Cross MS50 produced by Seiko Chemical Co., Ltd.) were compounded, and the resulting mixture was melt-kneaded at a cylinder temperature of 200° C. by a twin-screw extruder, and 2.0 parts by weight (0.2 parts by weight as an organic peroxide) of 2,5-dimethyl-2,5-di(tert-butyl peroxy)hexane (organic peroxide) diluted to a 10% concentration with a paraffin-based oil was further added during melt-kneading. To this, 40 parts by weight of (PP-1) was further added as the component (A1) at the downstream part of an addition point of the organic peroxide in the twin-screw extruder to obtain a thermoplastic elastomer composition. The results of measurement of properties of the obtained thermoplastic elastomer composition are shown in Table 1.

Example 5

80 parts by weight of (PP-1) as the component (A1), 80 parts by weight of (EPDM-1) as the component (B), 20 parts by weight of (oil) as the component (C), 0.1 part by weight of erucamide (NEUTRON S produced by NIPPON FINE CHEMICAL Co., Ltd.), 0.2 part by weight of an antioxidant (Sumilizer GA-80 produced by Sumitomo Chemical Co., Ltd.) and 0.1 part by weight of an antioxidant (IRGAFOS 168 produced by Ciba Speciality K.K.), and 0.8 part by weight of a cross-linking aid (trimethylolpropane trimethacrylate, trade name Hi-Cross MS50 produced by Seiko Chemical Co., Ltd.) were compounded, and the resulting mixture was melt-kneaded at a cylinder temperature of 200° C. by a twin-screw extruder, and 2.0 parts by weight (0.2 parts by weight as an organic peroxide) of 2,5-dimethyl-2,5-di(tert-butyl peroxy)hexane (organic peroxide) diluted to a 10% concentration with a paraffin-based oil was further added during melt-kneading. To this, 20 parts by weight of (PP-2) was further added as the component (A2) at the downstream part of an addition point of the organic peroxide in the twin-screw extruder to obtain a thermoplastic elastomer composition. The results of measurement of properties of the obtained thermoplastic elastomer composition are shown in Table 1.

Example 6

60 parts by weight of (PP-1) as the component (A1), 80 parts by weight of (EPDM-1) as the component (B), 20 parts by weight of (oil) as the component (C), 0.1 part by weight of erucamide (NEUTRON S produced by NIPPON FINE CHEMICAL Co., Ltd.), 0.2 part by weight of an antioxidant (Sumilizer GA-80 produced by Sumitomo Chemical Co., Ltd.) and 0.1 part by weight of an antioxidant (IRGAFOS 168 produced by Ciba Speciality K.K.), and 0.8 part by weight of a cross-linking aid (trimethylolpropane trimethacrylate, trade name Hi-Cross MS50 produced by Seiko Chemical Co., Ltd.) were compounded, and the resulting mixture was melt-kneaded at a cylinder temperature of 200° C. by a twin-screw extruder, and 2.0 parts by weight (0.2 parts by weight as an organic peroxide) of 2,5-dimethyl-2,5-di(tert-butyl peroxy)hexane (organic peroxide) diluted to a 10% concentration with a paraffin-based oil was further added during melt-kneading. To this, 40 parts by weight of (PP-2) was further added as the component (A2) at the downstream part of an addition point of the organic peroxide in the twin-screw extruder to obtain a thermoplastic elastomer composition. The results of measurement of properties of the obtained thermoplastic elastomer composition are shown in Table 1.

TABLE 1

| | | Example 1 | Comparative Example 1 | Comparative Example 2 | Example 2 | Comparative Example 3 | Example 3 | Comparative Example 4 | Comparative Example 5 | Comparative Example 6 | Example 4 | Example 5 | Example 6 |
|---|---|---|---|---|---|---|---|---|---|---|---|---|---|
| PP-1 | | 100 | 100 | 100 | 100 | 100 | 100 | 100 | 100 | | 60 | 80 | 60 |
| PP-2 | | | | | | | | | | 100 | | | |
| EPDM-1 | | 100 | 100 | 400 | 80 | 80 | 40 | | 25 | 80 | 80 | 80 | 80 |
| EPDM-2 | | | | | | | 40 | 80 | 25 | | | | |
| Oil | | | | | 20 | 20 | 20 | 20 | 50 | 20 | 20 | 20 | 20 |
| Organic peroxide | | 0.2 | | 0.2 | 0.2 | 0.5 | 0.2 | 0.2 | 0.2 | 0.2 | 0.2 | 0.2 | 0.2 |
| PP-1 (*) | | | | | | | | | | | 40 | | |
| PP-2 (*) | | | | | | | | | | | | 20 | 40 |
| Iodine value of component (B) | | 1.3 | 1.3 | 1.3 | 1.3 | 1.3 | 6.2 | 11 | 6.2 | 1.3 | 1.3 | 1.3 | 1.3 |
| MFR | (g/10 min) | 2.3 | 8 | <1 | 16 | 46 | 32 | 40 | 67 | 11 | 40 | 10 | 7 |
| Gloss | | 29 | 58 | 30 | 32 | 31 | 36 | 34 | 44 | 77 | 27 | 37 | 39 |
| Izot | −35° C. | NB | NB | NB | NB | B | NB | NB | B | NB | NB | NB | NB |
| | −40° C. | NB | NB | NB | NB | B | NB | B | B | NB | NB | NB | NB |
| | −45° C. | NB-B | NB | NB | NB-B | B | B | B | B | NB-B | NB | NB-B | NB |
| Whitening resistance | | | | | | Poor | | | | | | Poor | Good |

(*) added at the downstream part of an addition point of the cross-linking agent (organic peroxide) in the twin-screw extruder

What is claimed is:

1. A thermoplastic elastomer composition for an air bag cover obtained by dynamically heat-treating, in the presence of a cross-linking agent, components (A1), (A2), (B) and (C):

the component (A1): a propylene-based resin containing the following components (a) and (b):

the component (a): a propylene-based polymer component in which the content of a monomer unit derived from propylene is 90 to 100 wt % of the component (a); and the component (b): an ethylene-α-olefin copolymer component in which the content of a monomer unit derived from ethylene is 20 to 80 wt % and the content of a monomer unit derived α-olefin is 80 to 20 wt % of the component (b), wherein the content of the component is (a) 70 to 90 wt % and the content of the component (b) is 30 to 10 wt %, and the total amount of the component (a) and (b) is 100 wt % of the component (A1), wherein the component (A1) has a melting temperature, measured by a differential scanning calorimeter, of 155° C. or more, and wherein the component (A1) has a [ηcxs] of 2 to 10 dl/g and a ratio [ηcxs]/[ηcxis]) of 2 to 10, where [ηcxs] is an intrinsic viscosity (135° C., tetralin) of a portion of the component (A1) soluble in xylene at 20° C. and [ηcxis] is an intrinsic viscosity (135° C., tetralin of a portion of the component (A1) insolube in xylene at 20° C.;

the component (A2): a propylene-based resin in which the content of a monomer unit derived from propylene is 90 to 98 wt % of the component (A2);

the component (B): an ethylene-α-olefin-nonconjugated diene copolymer rubber in which the content of a monomer unit derived from ethylene is 35 to 75 wt % and the content of a monomer unit derived from α-olefin is 65 to 25 wt %, and wherein the ethylene-α-olefin-nonconjugated diene copolymer rubber has an iodine value of 0.1 to 7 and a Mooney viscosity ($ML_{1+4}$, 125° C.) of 20 to 100; and the component (C): a mineral oil-based softener, where the content of the component (A2) is 30 to 70 parts by weight, the content of the component (B) is 60 to 150 parts by weight, and the content of the component (C) is 0 to 40 parts by weight per 100 parts by weight of the total amount of the components (A1) and (A2), and wherein the amount of a cross-linking agent is 0.01 to 0.3 part by weight per 100 parts by weight of the total amount of the components (A1), (A2), (B) and (C).

2. The thermoplastic elastomer composition according to claim 1, wherein the content of a monomer unit derived from propylene in 98 to 100 wt % of the component (a), and the content of a monomer unit derived from propylene is 90 to 96 wt % of the component (A2).

3. An air bag cover obtained by molding the thermoplastic elastomer composition according to claim 1.

4. A method for producing the thermoplastic elastomer composition according to claim 1, which is obtained by melt-kneading the components (A1), (B) and (C), adding a cross-linking agent, and dynamically heat-treating the resulting mixture.

5. A method for producing the thermoplastic elastomer composition according to claim 1, which is obtained by melt-kneading the components (A1), (A2), (B) and (C), adding a cross-linking agent, and dynamically heat-treating the resulting mixture.

6. A method for producing the thermoplastic elastomer composition according to claim 1, wherein 20 to 80 parts by weight of the component (A1) and all amounts of the component (B) and the component (C) are supplied at an upstream position of an extruder, wherein the amount of the component (A1) to be added is 100 parts by weight, and a cross-linking agent is supplied at a downstream position to the upstream position and the remaining 80 to 20 parts by weight of the component (A1) is supplied at a further downstream position of the extruder to dynamically heat-treating the resulting mixture.

7. A method for producing the thermoplastic elastomer composition according to claim 1, wherein 20 to 80 parts by weight of the component (A1) and the component (A2), and all amounts of the component (B) and the component (C) are supplied at an upstream position of an extruder, wherein the total amount of the component (A1) and the component (A2) is 100 parts by weight, and a cross-linking agent is supplied at a downstream position of the upstream position and the remaining 80 to 20 parts by weight of the component (A1) and the component (A2) is supplied at a further downstream position of the extruder to dynamically heat-treating the resulting mixture.

* * * * *